(12) United States Patent
Yu

(10) Patent No.: US 6,937,228 B2
(45) Date of Patent: Aug. 30, 2005

(54) TWO-AXIS BALL-BASED CURSOR CONTROL APPARATUS WITH TACTILE FEEDBACK

(75) Inventor: Yat Shun (Damien) Yu, British Columbia (CA)

(73) Assignee: VTech Telecommunications Ltd.,, Tai Po (HK)

( * ) Notice: Subject to any disclaimer, the term of this patent is extended or adjusted under 35 U.S.C. 154(b) by 370 days.

(21) Appl. No.: 10/059,463

(22) Filed: Jan. 29, 2002

(65) Prior Publication Data

US 2002/0101402 A1 Aug. 1, 2002

(51) Int. Cl.⁷ .............................................. G09G 5/08
(52) U.S. Cl. ...................... 345/167; 345/163; 345/157
(58) Field of Search ................................ 345/156, 157, 345/163–166, 167; 341/20, 27; D14/402, 417

(56) References Cited

U.S. PATENT DOCUMENTS

| | | | |
|---|---|---|---|
| 5,288,993 A | * 2/1994 | Bidiville et al. ............. 250/221 |
| 5,635,956 A | * 6/1997 | Tak ............................. 345/163 |
| 5,825,353 A | * 10/1998 | Will ............................ 345/184 |
| 5,886,310 A | 3/1999 | Kataoka et al. ............. 200/14 |
| 5,894,118 A | 4/1999 | Nishimoto et al. .......... 200/527 |
| 5,952,628 A | 9/1999 | Sato et al. ..................... 200/4 |
| 6,097,964 A | 8/2000 | Nuovo et al. ................ 455/550 |
| 6,127,636 A | 10/2000 | Parvulescu et al. ......... 200/11 R |
| 6,144,370 A | * 11/2000 | Eleyan et al. ................ 345/167 |
| 6,172,665 B1 | * 1/2001 | Bullister ...................... 345/163 |
| 6,184,480 B1 | 2/2001 | Nishimoto et al. ........... 200/4 |
| 6,194,673 B1 | 2/2001 | Sato et al. ..................... 200/4 |
| 6,198,054 B1 | 3/2001 | Janniere ...................... 200/5 R |
| 6,198,057 B1 | 3/2001 | Sato et al. ..................... 200/28 |
| 6,218,635 B1 | 4/2001 | Shigemoto et al. .......... 200/570 |
| 6,229,103 B1 | 5/2001 | Yamamoto et al. ............. 200/4 |
| 6,236,002 B1 | 5/2001 | Chou ............................. 200/4 |
| 6,480,185 B1 | * 11/2002 | Kiljander et al. ............ 345/167 |
| 6,654,003 B2 | * 11/2003 | Boldy ........................... 345/157 |
| 2003/0020690 A1 | * 1/2003 | Chen et al. ................... 345/167 |
| 2003/0076303 A1 | * 4/2003 | Huppi ........................... 345/163 |
| 2003/0142071 A1 | * 7/2003 | Yu ................................ 345/157 |

FOREIGN PATENT DOCUMENTS

EP        WO 98/30971       *  7/1998

* cited by examiner

Primary Examiner—Ricardo Osorio
(74) Attorney, Agent, or Firm—Michael Bednarek; Pillsbury Winthrop Shaw Pittman LLP

(57) ABSTRACT

A two-axis ball-based cursor control apparatus with tactile feeling is provided, which includes a housing; a spherical ball contained partially within the housing and having a plurality of recesses distributed about its outer surface; two pairs of spring biased sensor mechanisms each including a probe, a spring, and a transducer; and a means for processing the signals received from the sensor mechanisms. Each of the four probes is positioned so that it rests within one of the recesses on the spherical ball when the ball is stationary. As the ball is rotated, the probes are pushed up and out of the recesses by the ball, causing the corresponding springs to alternately compress and decompress, before the probes come to rest in adjacent recesses. Each transducer generates an electrical signal corresponding to the rate of compression and decompression in the corresponding spring. The signal processing means then translates the signals from each of the transducers into movement of a cursor on an electronic display screen which corresponds to the rotation of the spherical ball about each of its axes.

19 Claims, 3 Drawing Sheets

TWO-AXIS BALL-BASED CURSOR CONTROL APPARATUS WITH TACTILE FEEDBACK

BACKGROUND OF THE INVENTION

1. Field of the Invention

The present invention relates in general to a two-axis ball-based cursor control apparatus, such as a mouse or trackball, and in particular to a cursor control apparatus which provides the user with tactile feedback corresponding to uniform incremental movements of a displayed cursor.

2. Background Art

Two-axis cursor control devices are well-known in the art. These types of devices are common components of personal computer systems used for controlling the movement of a cursor appearing on a video monitor. Cursor control devices are also finding use in handheld devices such as PDA's and cellular telephones where graphical user interfaces are manipulated by the user. Two well-known forms of such devices include the computer mouse and the trackball. A computer mouse typically consists of a spherical ball, approximately one-half inch in diameter and freely rotatable about two axes of rotation, mounted within a larger housing which rests on a flat surface, so that a portion of the ball protrudes from the bottom of the housing and comes into contact with the surface. Typically, a pair of rotors are positioned in contact with the ball, one aligned with each axis. Each of these rotors are in turn connected to a disk-shaped apparatus with uniformly spaced holes around the outer portion of the disk. When the mouse is moved along the flat surface, the rotation of the ball is translated to the rotors, and in turn to the associated disks. Light sensors positioned near each of the disks determine the number of times a beam of light passing through a hole in the disk is interrupted as the disk rotates. From this signal, the direction and acceleration of the displacement of the ball, and hence of the mouse itself, is determined. This information is then translated into motion of the cursor on the screen of the computer using a predetermined relationship between the magnitude of the mouse displacement in each direction and the distance which the cursor moves in that direction. Thus, the user's horizontal and vertical movement of the mouse on the flat surface is translated into horizontal and vertical movement of the cursor on the screen.

A trackball is a similar type of cursor control apparatus in which the user merely rotates the ball itself instead of moving the entire housing. The ball typically protrudes from the top of its housing, where it can be rotated directly by the user by hand. The remainder of the device is typically substantially similar to that described above, with the rotation of the ball translated to a pair of rotors associated with each axis of rotation, and then to a pair of disks, whose motion is then translated into cursor motion by light sensors. Thus, unlike a mouse, a trackball apparatus remains stationary while the user directly rotates the ball itself.

There are, however, certain disadvantages to these types of cursor control devices. In order to achieve precise targeting of the cursor, the user must possess a certain degree of hand to eye coordination to align the cursor with the desired location. This can be troublesome in certain applications, such as pull-down menus implemented in PC graphical user interface based operating systems. Typically a single mouse click causes a number of further commands or options to appear in row after row. To select a give command or option the user must position the cursor over the text label for the desired option to execute same. Any slight movement of the device by the user will cause the cursor displayed on the screen to move to a different command or option item than that desired. Positioning is accomplished by moving the mouse or trackball, which moves in one continuous motion, until the cursor is in position. The absence of any tactile feedback corresponding to the movement of the cursor makes such precise targeting even more difficult. In addition, some devices have a tendency for the cursor to drift from its desired location because any slight or unintentional force exerted on the control device will cause it to move, and correspondingly displace the cursor from the desired location. In applications where precise targeting and control of the cursor is essential, for instance in computer aided drafting, these drawbacks are particularly unwelcome. Incorporating graphical user interfaces into smaller devices, such as cellular phones, causes potential safety issues. For example, a person using a phone in a car to recall a speed dial number using the graphical interface may cause an accident by trying to align a cursor over the display of names or numbers stored in memory.

Also known in the prior art are control devices consisting of a rotatable disk or wheel which is rotatable about only one axis in discrete, uniform increments. Examples of such devices include dials for applications such as frame-by-frame movement in a video-disc player or to switch tracks on an audio-disc player. Such devices may provide tactile feedback to the user in the form of a "clicking" or ratcheting effect which occurs when the disk or wheel is rotated. The user knows when such a device has advanced from one position to the next because of the tactile sensation triggered by the dial "snapping" into the next position. Such known devices, however, have the disadvantage of providing such incremental rotation about only one axis, therefore making them ill-suited for applications requiring control of a cursor moving in two dimensions.

It would therefore be desirable to provide a cursor control device which would allow the user to move the cursor in discrete, uniform increments in two dimensions, in order to more easily achieve precise targeting of the cursor with its intended position on the screen. Further, it would also be desirable to provide for such a device which provides tactile feedback to the user which corresponds to the movement of the cursor on the screen. In addition, it would be desirable to provide for such a device in which the unintentional motion of the cursor due to inadvertent movement of the device is minimized.

These and other objects of the present invention will become apparent to those of ordinary skill in the art in light of the present specifications, drawings, and claims.

SUMMARY OF THE INVENTION

The present invention is directed to a two-axis ball-based cursor control apparatus providing for discrete, uniform displacements in each direction of rotation in order to achieve a precise alignment of cursor and target in electronic displays, and also providing for tactile feedback corresponding to each incremental displacement. The cursor control apparatus comprises a housing, a spherical ball capable of rotating about at least two axes and including a plurality of recesses distributed about its outer surface, two pairs of spring biased sensor mechanisms disposed within the housing for measuring the displacement of the spherical ball about each of two axes of rotation, and a means for processing the signals received from each of the sensor mechanisms in order to determine the direction and rate of rotation of the spherical ball about each of two axes of rotation. Each of the sensor mechanisms includes a probe configured to rest within the recesses on the spherical ball, a spring serving to bias the probe toward the surface of the spherical ball, and a transducer connecting with the spring for generating an electrical signal corresponding to the magnitude of compression and decompression of the spring. The means for processing the signals received from each of the sensor mechanisms determines the direction and rate of rotation of the spherical ball about each of two axes of rotation based on the waveform of the signals.

In a further embodiment of the invention, the probes associated with one pair of sensor mechanisms are of substantially identical shape and orientation, and the probes associated with the other pair of sensor mechanisms are also of substantially identical shape and orientation. In this configuration, when the spherical ball is rotated about one of its axes, both of the springs associated with each pair of sensor mechanisms are compressed in a like fashion, such that the waveforms generated by a pair of sensor mechanisms are substantially identical in shape to one another, while having a different shape than the waveforms generated by the other pair of sensor mechanisms.

In another embodiment of the invention, the probes associated with the first and second sensor mechanisms are offset from one another relative to the recesses on the surface of the spherical ball, and the probes associated with the third and fourth sensor mechanisms are also offset from one another relative to the recesses on the surface of the spherical ball. As a result, when the spherical ball is rotated about one of its axes, the electrical signals generated by one pair of sensor mechanisms manifest a phase shift, thereby permitting the signal processing means to determine the direction of rotation of the spherical ball about that axis.

In one embodiment of the cursor control apparatus, the spherical ball protrudes partially from the housing such that the spherical ball is directly rotated by the user to generate motion of a cursor on an electronic display screen.

Another embodiment of the invention includes at least one switch element for allowing the user to select options corresponding to particular cursor locations on an electronic display screen. This at least one switch element may comprise at least one button element which is manipulated directly by pressure applied thereto by the user in order to trigger the at least one switch element. The at least one switch element may instead be positioned so as to come into contact with the spherical ball when pressure is applied to the spherical ball by the user, causing the spherical ball to depress the switch element, thereby triggering the switch element.

DETAILED DESCRIPTION OF THE INVENTION

Figure 1:
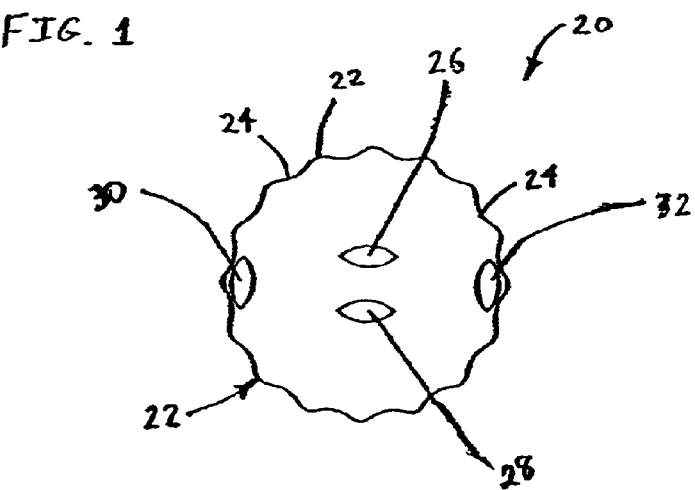
FIG. 1 is a top schematic view of a portion of a cursor control apparatus according to the present invention.

While this invention is susceptible of embodiment in many different forms, there is shown in the drawings and will be described herein one specific embodiment, with the understanding that the present disclosure is to be considered as an exemplification of the principles of the invention and is not intended to limit the invention to the embodiment illustrated.

Figure 2:
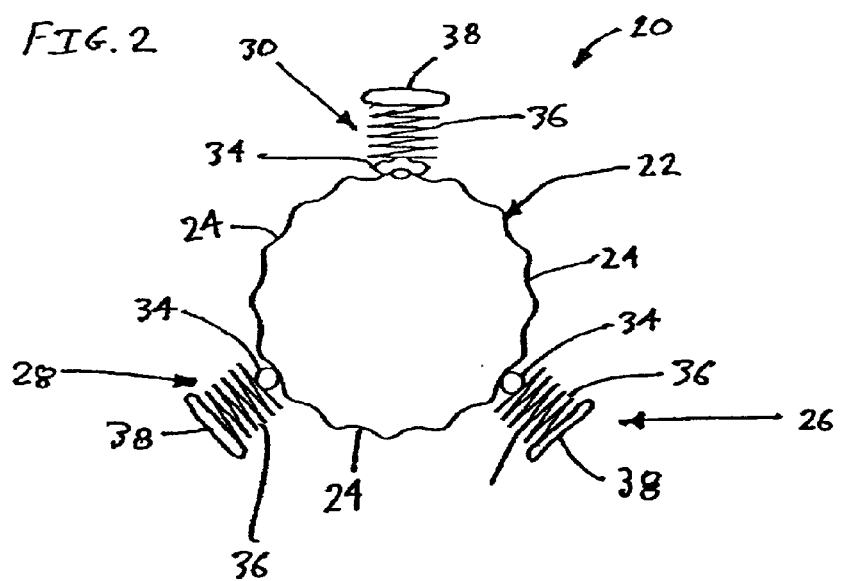
FIG. 2 is a front schematic elevational view of a portion of the cursor control apparatus shown in FIG. 1.

The novel portion of a two-axis ball-based cursor control apparatus with tactile feedback 20 is shown in FIGS. 1 and 2 as including spherical ball 22, first sensor mechanism 26, second sensor mechanism 28, third sensor mechanism 30, and fourth 10 sensor mechanism 32. Additionally, spherical ball 22 is shown as including recesses 24, which consist of uniform depressions distributed symmetrically about the surface of spherical ball 22. Preferably, the outer surface of spherical ball 22 resembles that of a golf ball, in that there are no flat areas on the surface; rather, there is a uniform arrangement of "peaks" and "valleys". Spherical ball 22 is contained at least partially within a housing (not shown).

Cursor control apparatus 20 is intended for use in controlling the movement of a cursor on electronic display screens, including cathode-ray screens, such as those commonly found in computers, and liquid crystal displays of the type commonly used in hand-held electronic devices, such as personal digital assistants (PDAs), cellular So telephones, and the like. Cursor control apparatus 20 is designed to provide cursor motion in two directions in discrete, uniform increments, along with tactile feedback to the user corresponding to each increment of motion. The size of the desired increments of motion can vary depending on the type of device in which the apparatus is used. For instance, if cursor control apparatus 20 is used in a hand-held device with a small liquid crystal display, each increment of cursor motion may correspond to as little as one pixel on the display screen. If, on the other hand, cursor control apparatus 20 is used with a conventional computer monitor with dimensions of thousand of pixels in length and width, then each increment of cursor motion may correspond to many pixels. When used in connection with a graphical user interface the degree of each increment of movement preferably corresponds to the height of a displayed line of text such that each increment of movement causes the cursor to move to the next displayed item in a pull down menu.

First sensor mechanism 26, second sensor mechanism 28, third sensor mechanism 30, and fourth sensor mechanism 32 are each shown in FIGS. 1 and 2 as including probe 34 and spring 36. Each of the sensor mechanisms is fixed in place within the housing relative to spherical ball 22. When spherical ball 22 is stationary, each probe 34 rests within one of recesses 24 on the surface of spherical ball 22. Each spring 36 is positioned so as to exert a force on the corresponding probe 34, which biases probe 34 toward the surface of spherical ball 22, causing probe 34 to be securely held within one of recesses 24.

In order to generate movement of the cursor, the user of cursor control apparatus 20 applies a rotational force to spherical ball 22, in a similar manner as with a conventional trackball device. As spherical ball 22 is rotated out of its stable position, probes 34 begin to move upward compressing the spring as probes 34 are pushed out is of recesses 24 As the ball 22 is moved, the probe will travel upward as the recess moves out from under the stationary probe 34 to a point where the spring is under maximum compression corresponding to the probe being positioned on a peak separating the recesses 24. As the ball 22 moves further the probe 34 will move downward into a recess as it passes below the probe tip. Accordingly, as the ball 22 moves the force exerted by the springs 36 on probes 34 will cause probe 34 to "snap" into the new recess 24 providing the user with tactile feedback which indicates that the cursor has moved another increment in the direction of motion of spherical ball 22.

Figure 2A:
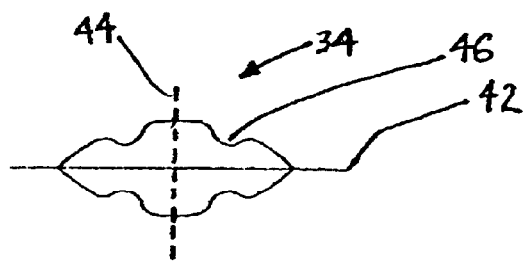
FIG. 2a is an elevational view of the probe portion of one of the sensor mechanisms of the cursor control apparatus shown in FIG. 1.

Each of sensor mechanisms 26, 28, 30, and 32 also include a transducer 38 which generates an electrical signal corresponding to the compression and decompression of springs 36. Probe 34 is shown in FIG. 2a as having a substantially football-shaped cross-section with several recesses 46 located on the top and bottom surfaces. However, as shown in FIG. 1, the pair of probes 34 which are associated with first and second sensor mechanisms 26 and 28 are oriented perpendicular to the pair of probes 34 which are associated with third and fourth sensor mechanisms 30 and 32.

As a result of the difference in orientation of the two pairs of probes 34, rotation of spherical ball 22 about one of its axes will cause one pair of probes 34 to move relative to spherical ball 22 along their longitudinal axis 42, while the other pair of probes 34 will move relative to spherical ball 22 along their shorter axis 44. This will result in different waveform patterns of spring compression as a function of time for each pair of probes 34. Further, although it is not apparent from the drawings, each pair of probes 34 is offset relative to recesses 24 on spherical ball 22 along their shorter axis 44. As a result, when spherical ball 22 rotates about the axis which corresponds to motion of one pair of probes 34 along their shorter axis 44, one of the springs 36 associated with that pair of probes 34 begins to compress slightly before the other. Which of the pair begins to compress first depends on the direction of rotation of spherical ball 22. This has the result of producing a phase shift in the waveforms generated by each sensor mechanism for motion of probes 34 relative to their shorter axis 44, which serves to indicate the direction of rotation of spherical ball 22.

Figure 3:
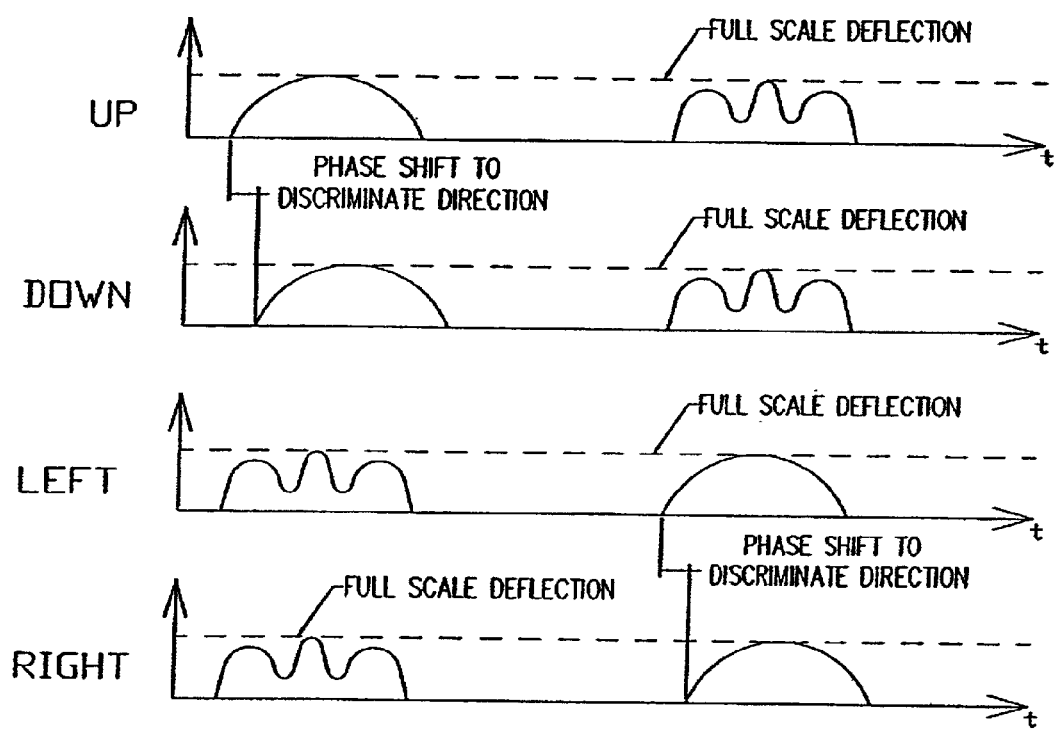
FIG. 3 is a diagram indicating the shapes of the waveforms produced by each pair of sensor mechanisms in the cursor control apparatus of FIG. 1 for each axis of rotation and each direction of rotation about those axes.

When spherical ball 22 is rotated through one increment of motion about one of its axes, one pair of probes 34 moves relative to spherical ball 22 along their shorter axis 44 from one recess 24 to the next. This causes each of those probes 34 to be pushed upward and then back downward as it passes over one of the "peaks" on the surface of spherical ball 22, generating a smooth sine-wave-like waveform pattern with one peak per cycle, as can be seen in FIG. 3. At the same time, the other pair of probes 34 are moving relative to spherical ball 22 along their longitudinal axis 44, causing the "peaks" on the surface of spherical ball 22 to encounter the several notches 46 found on the bottom surface of each probe 34. This generates a waveform pattern for each of these probes 34 having several peaks per cycle, as can also be seen in FIG. 3. The difference in the shape of the waveforms generated by each pair of sensor mechanisms during an increment of motion is then used to determine which axis spherical ball 22 has rotated about. However, the particular shape of probes 34 shown in FIG. 2a is not necessary to practice the invention. Rather, probes 34 may take on any desired shape which would allow for the determination of the direction of rotation of spherical ball 22 based on the difference in waveforms generated by each of the two pairs of sensors.

FIG. 3 shows an example of how this difference in waveform shape can be used to determine the axis and direction of rotation of spherical ball 22. Each of the two columns shows the shape of the waveform generated by motion about one axis of rotation for each sensor mechanism. The directions of rotation are arbitrary depending on the orientation of the observer, but the two pairs of sensor mechanisms are indicated in FIG. 3 as "up"/"down" and "left"/"right". As can be seen from the first column of FIG. 3, when spherical ball 22 is rotated one increment about the first axis of rotation, the waveform generated by the "up/down" pair of sensors shows a smooth concave deflection pattern, with a single peak, with a slight phase shift to indicate the direction of rotation, as described above. This is consistent with movement of probes 34 of the "up/down" pair of sensors along the surface of spherical ball 22 in the direction of their shorter axis 44. If the direction of rotation about that axis is reversed, then the phase shift will still occur, but with the other sensor in the pair beginning its compression first. At the same time, the waveform generated by the "left/right" pair of sensors shows a deflection pattern with several peaks. This is consistent with the movement of probes 34 of the "left/right" pair of sensors along the surface of spherical ball 22 in the direction of the longitudinal axis 42 of probes 34, in which the notches 46 on the surface of probes 34 will encounter the "peaks" on the surface of spherical ball 22 several times during each incremental rotation. Similarly, when spherical ball 22 is rotated one increment about the other axis of rotation, as shown in the second column of FIG. 3, the waveform shapes generated by each pair of sensors are reversed. As a result, the shape of the waveforms produced by each of the four sensor mechanisms can be used to determine the axis and direction of rotation of spherical ball 22.

Figure 4:
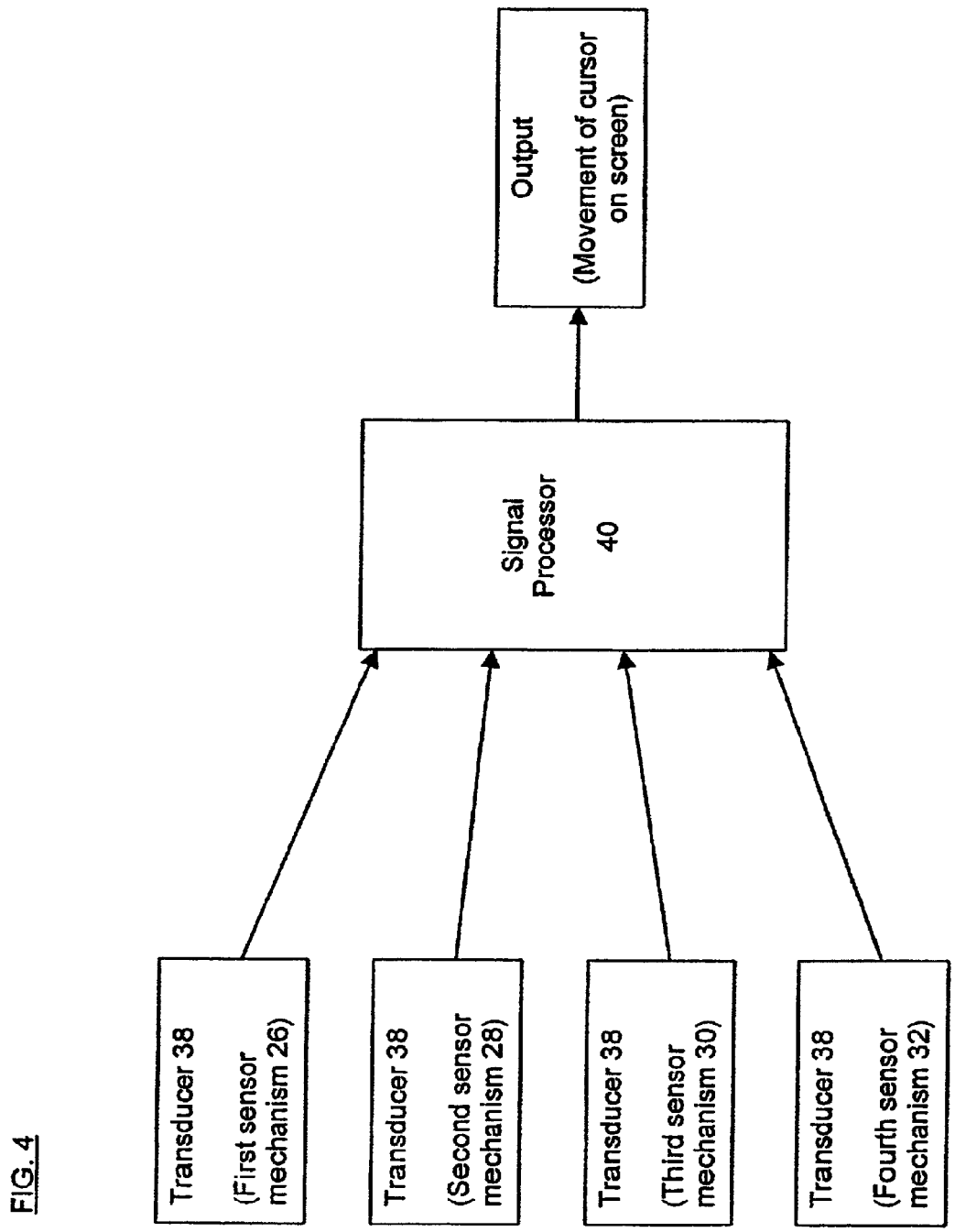
FIG. 4 is a diagram showing how signals from the sensor mechanisms in the cursor control apparatus of FIG. 1 are processed to yield movement of a cursor on an electronic display screen.

The signals generated by each of transducers 38 are then processed by signal processor 40 to generate motion of a cursor on a display screen, as shown in FIG. 4. Signal processor 40 determines which axis (or axes) spherical ball 22 has rotated about and the direction of rotation using the waveforms received from each transducer 38, as described above. This information is then forwarded to the computer or other device with which cursor control apparatus 20 is being used, and translated there to horizontal and vertical cursor motion, which corresponds to the rotation of spherical ball 22 about each of its axes.

Each shift of spherical ball 22 from one stable position to the next corresponds to one increment of cursor motion. Therefore, the number of increments of cursor motion per complete revolution of spherical ball 22 depends on the number of recesses 24 distributed over the surface of spherical ball 22. The surface of spherical ball 22 is arranged such that recesses 24 are separated by small "peaks" and with no flat surfaces, so that the force exerted on probes 34 by springs 36 causes probes 34 to "snap" into recesses 24 as spherical ball 22 is rotated. This snapping effect which occurs with each incremental rotation provides the user with tactile feedback corresponding to the number of increments of motion through which spherical ball 22 has moved. The force exerted by springs 36 on spherical ball 22 also holds spherical ball 22 in place absent an applied force on spherical ball 22 by the user, thereby minimizing unwanted and unintentional cursor motion.

Cursor control apparatus 20 preferably also includes a button or switch elements allowing the user to make selections in conjunction with the position of the cursor on the screen. These elements may take any of several forms, including buttons such as those found on the top side of a conventional computer mouse and/or a switch element located beneath spherical ball 22 which is activated by pressing down on spherical ball 22, thereby depressing the switch element.

The foregoing description and drawings are merely to explain and illustrate the invention, and the invention is not limited thereto except insofar as the independent claims are so limited, as those skilled in the art with the present disclosure before them will be able to make modifications and variations therein without departing from the scope of the invention.

What is claimed is:

1. A two-axis ball-based cursor control apparatus providing for discrete, uniform displacements in each direction of rotation in order to achieve a precise alignment of a cursor and target in electronic displays while simultaneously providing tactile feedback to the user corresponding to each incremental displacement, said cursor control apparatus comprising:

a housing;

a spherical ball contained at least partially within said housing, said spherical ball capable of rotating about at least two axes, and said spherical ball further including a plurality of recesses distributed about the outer surface of said spherical ball;

a first pair of spring biased sensor mechanisms disposed within the housing, including a first sensor mechanism and a second sensor mechanism for measuring the displacement of said spherical ball about a first axis of rotation, and a second pair of spring biased sensor mechanisms disposed within the housing, including a third sensor mechanism and a fourth sensor mechanism for measuring the displacement of said spherical ball about a second axis of rotation; and wherein each of said sensor mechanisms includes a probe configured to rest within said recesses on said spherical ball, a spring serving to bias said probe toward the surface of said spherical ball, whereby said spring compresses and decompresses as a result of the normal force exerted on said probe by the sides of said recesses as said spherical ball is rotated, and a transducer connecting with said spring for generating an electrical signal corresponding to the rate of compression and decompression of said spring; and a means for processing the signals, corresponding to the rate of compression and decompression, received from said sensor mechanisms in order to determine the direction and rate of rotation of said spherical ball about each axis of rotation based on the waveform of the signals received from each of said transducers.

2. The two-axis cursor control apparatus according to claim 1, wherein said probes associated with said first and second sensor mechanisms are of substantially identical shape and orientation, and said probes associated with said third and fourth sensor mechanisms are of substantially identical shape and orientation, so that when said spherical ball is rotated about one of its axes, both of said springs corresponding to each pair of sensor mechanisms are compressed in a like fashion, such that the waveforms generated by a pair of sensor mechanisms are identical in shape to one another, while having a different shape than the waveforms generated by the other pair of sensor mechanisms.

3. The two-axis cursor control apparatus according to claim 1, wherein said probes associated with said first and second sensor mechanisms are offset from one another relative to said recesses on said spherical ball, and said probes associated with said third and fourth sensor mechanisms are offset from one another relative to said recesses on said spherical ball, such that when said spherical ball is rotated about one axis, the electrical signals generated by at least one pair of said sensor mechanisms manifest a phase shift, thereby permitting said signal processing means to determine the direction of rotation of said spherical ball about that axis.

4. The two-axis cursor control apparatus according to claim 1, wherein said spherical ball protrudes partially from said housing such that said spherical ball is directly rotated by the user in order to generate motion of a cursor on an electronic display screen.

5. The two-axis cursor control apparatus according to claim 1, further comprising at least one switch element for allowing the user to select options corresponding to particular cursor locations on an electronic display screen.

6. The two-axis cursor control apparatus according to claim 5, wherein said at least one switch element comprises at least one button element which is manipulated directly by pressure applied thereto by the user, triggering said switch element.

7. The two-axis cursor control apparatus according to claim 5, wherein said at least one switch element is positioned so as to contact said spherical ball when pressure is applied to said spherical ball by the user, causing said spherical ball to depress said switch element, thereby triggering said switch element.

8. A two-axis ball-based cursor control apparatus providing for displacements in each direction of rotation to achieve a precise alignment of a cursor and target in electronic displays while simultaneously providing tactile feedback to a user corresponding to each incremental displacement, the cursor control apparatus comprising:

a housing;

a spherical ball contained at least partially within the housing, the spherical ball capable of rotating about at least two axes, and the spherical ball further including a plurality of recesses distributed about the outer surface of the spherical ball;

a first pair of spring biased sensor mechanisms disposed within the housing, including a first sensor mechanism and a second sensor mechanism for measuring displacement of the spherical ball about a first axis of rotation;

a second pair of spring biased sensor mechanisms disposed within the housing, including a third sensor mechanism and a fourth sensor mechanism for measuring displacement of the spherical ball about a second axis of rotation;

wherein each of the sensor mechanisms includes a probe configured to rest within the recesses on the spherical ball, a spring serving to bias the probe toward the surface of the spherical ball, whereby the spring compresses and decompresses as a result of a normal force exerted on the probe by sides of the recesses as the spherical ball is rotated, and a transducer connecting with the spring for generating an electrical signal corresponding to a rate of compression and decompression of the spring;

wherein the probes associated with the first and second sensor mechanisms are of substantially identical shape and orientation, and the probes associated with the third and fourth sensor mechanisms are of substantially identical shape and orientation, so that when the spherical ball is rotated about one of its axes, both of the springs corresponding to each pair of sensor mechanisms are compressed in a like fashion, such that waveforms generated by a pair of sensor mechanisms are identical in shape to one another, while having a shape different from waveforms generated by the other pair of sensor mechanisms; and means for processing the electrical signal, corresponding to the rate of compression and decompression, received from the sensor mechanisms to determine direction and rate of rotation of the spherical ball about each axis of rotation based on a waveform of the electrical signal received from each of the transducers.

9. The apparatus of claim 8, wherein the probes associated with the first and second sensor mechanisms are offset from one another relative to the recesses on the spherical ball, and the probes associated with the third and fourth sensor mechanisms are offset from one another relative to the recesses on the spherical ball, such that when the spherical ball is rotated about one axis, the electrical signals generated by at least one pair of the sensor mechanisms manifest a phase shift, thereby permitting the signal processing means to determine direction of rotation of the spherical ball about that axis.

10. The apparatus of claim 8, wherein the spherical ball protrudes partially from the housing such that the spherical ball is directly rotated by the user to generate motion of a cursor on an electronic display screen.

11. The apparatus of claim 8, further comprising at least one switch element for allowing the user to select options corresponding to particular cursor locations on an electronic display screen.

12. The apparatus of claim 11, wherein the at least one switch element comprises at least one button element which is manipulated directly by pressure applied thereto by the user, triggering the switch element.

13. The apparatus of claim 11, wherein the at least one switch element is positioned so as to contact the spherical ball when pressure is applied to the spherical ball by the user, causing the spherical ball to depress the switch element, thereby triggering the switch element.

14. A method for detecting displacement of a ball-based cursor control apparatus, comprising:

providing a plurality of recesses distributed about an outer surface of a spherical ball of the ball-based cursor control apparatus providing a probe and a spring in each sensor mechanism, wherein the spring is configured to bias the probe to rest within the recesses on the spherical ball; using a transducer connecting the spring for generating electrical signals;

generating a first electrical signal corresponding to rate of compression and decompression of a first pair of sensor mechanisms that interacts with the recesses; and processing the first electrical signal, corresponding to the rate of compression and decompression, received from the first pair of sensor mechanisms to determine direction and rate of rotation of the spherical ball about a first axis of rotation based on waveform of the first electrical signal.

15. The method of claim 14, further comprising:

generating a second electrical signal corresponding to rate of compression and decompression of a second pair of sensor mechanisms that interacts with the recesses; and processing the second electrical signal received from the second pair of sensor mechanisms to determine direction and rate of rotation of the spherical ball about a second axis of rotation based on waveform of the second electrical signal.

16. The method of claim 15, wherein the probes associated with the first pair of sensor mechanisms are of substantially identical shape and orientation, and the probes associated with the second pair of sensor mechanisms are of substantially identical shape and orientation, so that when the spherical ball is rotated about one of its axes, both of the springs corresponding to each pair of sensor mechanisms are compressed in a like fashion, such that the waveforms generated by a pair of sensor mechanisms are identical in shape to one another, while having a shape different from the waveforms generated by the other pair of sensor mechanisms.

17. The method of claim 15, wherein the probes associated with the first pair of sensor mechanisms are offset from one another relative to the recesses on the spherical ball, and the probes associated with the second pair of sensor mechanisms are offset from one another relative to the recesses on the spherical ball, such that when the spherical ball is rotated about one axis, the electrical signals generated by at least one pair of the sensor mechanisms manifest a phase shift, thereby permitting determination of the direction of rotation of the spherical ball about that axis.

18. The method of claim 14, further comprising:

allowing a user of the ball-based cursor control apparatus to select options corresponding to particular cursor locations on an electronic display screen by using at least one switch element associated with the ball-based cursor control apparatus.

19. The method of claim 18, wherein the at least one switch element comprises at least one button element which is manipulated directly by pressure applied thereto by the user, triggering the switch element.

* * * * *